US008792385B2

(12) United States Patent
Fu et al.

(10) Patent No.: US 8,792,385 B2
(45) Date of Patent: Jul. 29, 2014

(54) METHOD AND DEVICE FOR AUTO-GENERATING GOOSE SIGNAL CONNECTION TOPOLOGY FROM SUBSTATION LEVEL

(75) Inventors: Haiming Fu, Beijing (CN); Yanjing Li, Fujian (CN); Chun Cui, Fujian (CN); Jinbao Chen, Fujian (CN); Hongzheng Chen, Fujian (CN)

(73) Assignee: ABB Technology Ltd., Zurich (CH)

( * ) Notice: Subject to any disclaimer, the term of this patent is extended or adjusted under 35 U.S.C. 154(b) by 298 days.

(21) Appl. No.: 13/382,248

(22) PCT Filed: Jul. 28, 2009

(86) PCT No.: PCT/CN2009/072946
§ 371 (c)(1),
(2), (4) Date: Jan. 4, 2012

(87) PCT Pub. No.: WO2011/011913
PCT Pub. Date: Feb. 3, 2011

(65) Prior Publication Data
US 2012/0099478 A1    Apr. 26, 2012

(51) Int. Cl.
| H04L 12/28 | (2006.01) |
| G06F 13/00 | (2006.01) |
| G05B 19/00 | (2006.01) |
| H02J 13/00 | (2006.01) |

(52) U.S. Cl.
CPC ............... *H02J 13/00* (2013.01); *G06F 13/00* (2013.01); *G05B 19/00* (2013.01); *Y04S 10/16* (2013.01); *Y02E 60/723* (2013.01)
USPC ...................................... 370/254

(58) Field of Classification Search
USPC ........ 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| 2008/0127210 A1 * | 5/2008 | Bosold et al. ................. 719/313 |
| 2009/0300165 A1 * | 12/2009 | Tuckey et al. ................. 709/224 |

FOREIGN PATENT DOCUMENTS

| CN | 101431254 A | 5/2009 |
| CN | 101490647 A | 8/2009 |
| WO | 2009049656 A1 | 4/2009 |

OTHER PUBLICATIONS

ISA/CN, International Search Report re Application No. PCT/CN2009/072946, May 6, 2010.

(Continued)

*Primary Examiner* — Jung-Jen Liu
(74) *Attorney, Agent, or Firm* — Anthony M. Del Zoppo, III; Driggs, Hogg, Daugherty & Del Zoppo Co., LPA

(57) ABSTRACT

The invention provides a method and device for auto-generating GOOSE signal connection topology from substation level based on IEC61850 standard. The method comprises the following steps: import substation configuration language (SCL) file; search all GOOSE input and output signals under each access point; match the output signals to the input signals; and generate GOOSE signal connection topology based on the result of said matching. The device comprises an importing module for importing substation configuration language file; a GOOSE signal analyzer for searching all of GOOSE input and output signals under each access point, and matching said GOOSE output signals to said GOOSE input signals; and topology data module for generating GOOSE signal connection topology based on said matching. The device comprises a storage module. The storage module comprises an input dataset for storing GOOSE input signals and an output dataset for storing GOOSE output signals and their matching input signals.

19 Claims, 5 Drawing Sheets

(56) References Cited

OTHER PUBLICATIONS

IPEA/CN, International Preliminary Report on Patentability re Application No. PCT/CN2009/072946, Nov. 3, 2011.

Zh U Bing Quan et al, Application of IEC 61850 GOOSE Technology on Protective Relaying, China Academic Journal Electronic Publishing House, Automation of Electric Power Systems, vol. 33, No. 8, Apr. 25, 2009, pp. 104-107.

* cited by examiner

METHOD AND DEVICE FOR AUTO-GENERATING GOOSE SIGNAL CONNECTION TOPOLOGY FROM SUBSTATION LEVEL

RELATED APPLICATION

This application is a national filing of PCT application Serial No. PCT/CN2009/072946, filed Jul. 28, 2009.

FIELD OF THE INVENTION

This invention relates to the field of substation communication within power systems, and more particularly to systems utilizing GOOSE communication as specified in the international standard known as IEC61850.

BACKGROUND OF THE INVENTION

In general, distributed application is necessary and important in substation automation systems. Distributed applications, such as station-wide interlock application, distributed protection coordination, etc., are accomplished through data exchange among intelligent electronic devices (IED). Data exchange among IEDs, also being called horizontal communication, is based on peer-to-peer communication. Traditionally, distributed application is implemented by hardwire among relevant IEDs, and transfer of data through special input/output (I/O) cards to be inserted onto expansion slots in the IEDs. The traditional method has some advantages, including, for example, ease in debugging and tracing of signals during the engineering phase, and the clarity and ease for monitoring of the signal flows among IEDs, However, it also has the following drawbacks:

1) a number of I/O expansion slots and cards are needed;
2) numerous hardwire connection cables are laid around IEDs;
3) only binary signal can be communicated between IEDs.

In actual application, all of the above mentioned problems severely limit the scope and flexibility of distributed applications in substation.

After the introduction of IEC61850, digital substation which is based on this standard, and adopts Industrial Ethernet network as the fundamental communication bus across the whole application domain, has developed rapidly and become a trend in the substation automation system design. Generic Object Oriented Substation Event (GOOSE) based on IEC61850 international standard is one of the communication protocols, which provide fast and reliable data exchange among IEDs based on peer-to-peer communication on Industrial Ethernet network. Currently, GOOSE communication has been able to replace the traditional method completely through network communication mechanism. This kind of signal in GOOSE communication is also called "virtual signal". Compared with hardwire connection, GOOSE communication network has more capacity and can transmit more diverse and complicated signals. So the scope of distributed application is more flexible for configuration and more reliable for communication. Furthermore, GOOSE communication network is easier for maintenance because no cable but only a few optical fibers or twisted-pairs are needed for connection among IEDs.

However, GOOSE network communication has disadvantages in actual application. As signal transmitted in the network is virtual and invisible, an efficient tool for signal testing and tracing is very important and needed. In fact, there is neither a method for GOOSE signal testing and monitoring, nor a method for checking the validity of the result of distributed application based on GOOSE. The logical connection relationship among the signals flowing among the IEDs is not explicit and there is no monitoring for the flow of the "virtual signal". The performance of GOOSE signal depends on many factors which are determined dynamically by the network. In order to improve the reliability and to realize the advantages of GOOSE application, testing and monitoring for GOOSE application become very important in actual application. Nevertheless, the information of GOOSE signal logical connection relationship (which is called GOOSE signal logical connection topology), which indicates where the IED GOOSE signal comes from and where the IED GOOSE signal goes to, is a prerequisite for GOOSE testing and monitoring application. To generate GOOSE signal logical connection topology, a configured SCD or CID file which including GOOSE signal shall be imported. There are lots of methods concerning how to configure a SCD or CID file. For example, CN101431254A disclosed a method for configuring a GOOSE virtual terminal of an intelligent device in a digitalized substation, comprising the following steps: at least respectively defining the opening-inserting logic 1-i of the intelligent device as virtual terminals IN1-INi, and defining the opening-outgoing logic 1-j as virtual terminals OUT1-OUTj; expressing configuration of each intelligent device GOOSE in the form of connection in accordance with the principles of relay protection based on the intelligent device; respectively defining the terminal logic connection 1-k as LL1-LLk; arranging and re-expressing the configuration of the intelligent devices GOOSE in form of a list according to the logic connection based on virtual terminal logic connection; a GOOSE figuration list consists of the virtual terminal logic connection and the corresponding starting point and end point, wherein, the logic connection consists of two lists of the logic connection number LLk and the logic connection name.

The above mentioned method has finished the GOOSE signal configuration and got the SCD file which will be used and requisite for generating GOOSE signal logical connection topology. However, so far there is no method for generating GOOSE signal logical connection topology based on configured SCD file.

It is obviously that how to generate GOOSE signal logical connection topology is crucial for a better GOOSE application.

SUMMARY OF THE INVENTION

To overcome the above shortcomings and solve the above-mentioned crucial problems, the main purpose of the present invention is to provide a method and device for auto-generating GOOSE signal connection topology from substation level.

According to one aspect of the invention, a method for auto-generating GOOSE signal connection topology from substation level is provided. The method comprises the following steps: import substation configuration language (SCL) file; search all GOOSE input and output signals under each access point; match the output signals to the input signals; and generate GOOSE signal connection topology based on the result of said matching.

According to a preferred embodiment of the present invention, the method for auto-generating GOOSE signal connection topology further comprises the step of generating a data model library for substation configuration language file. The data model library is generated according to the imported substation configuration language file.

According to the method, all communication sub-networks are searched to check if there exists a communication sub-network that can transmit GOOSE signal. If there is no communication sub-network that can transmit GOOSE signal, GOOSE signal connection topology can not be generated.

According to a preferred embodiment of the present invention, searching all of GOOSE input and output signals under each access point can be implemented through the following steps: 1) search all access point in each said communication sub-network; or search all IEDs; 2) check if said access point has a server; 3) check if there exists a GOOSE control block in each logical device under said server; 4) find all GOOSE output signals in dataset which is referred by said GOOSE control block; and find all GOOSE input signals in each logical node under each said logical device.

According to the preferred embodiment of the present invention, searching all of GOOSE input and output signals under each access point further comprises the following steps: create an IED for GOOSE analysis; and generate a new logical node of GOOSE logic link bus for the said server in said IED.

According to a preferred embodiment of the present invention, to match between GOOSE input signals and GOOSE output signals, first find each GOOSE input signals within logical node of GOOSE logic link bus; and then search other logical nodes of GOOSE logic link bus to find the output signal matching to said GOOSE input signal.

Furthermore, create input dataset for GOOSE input signals and output dataset for GOOSE output signals in said logical node of GOOSE logic link bus. And add the GOOSE input signals into the said input dataset; add the GOOSE input signals into the output dataset of its matching output signal.

According to another aspect of the invention, a device for auto-generating GOOSE signal connection topology from substation level is provided. The device comprises an importing module for importing substation configuration language file; a GOOSE signal analyzer for searching all of GOOSE input and output signals under each access point, and matching said GOOSE output signals to said GOOSE input signals; and topology data module for generating GOOSE signal connection topology based on said matching.

According to a preferred embodiment of the present invention, the device for auto-generating GOOSE signal connection topology further comprises a storage module. The storage module comprises an input dataset for storing GOOSE input signals and an output dataset for storing GOOSE output signals and their matching input signals.

BRIEF DESCRIPTION OF THE DRAWINGS

The subject matter of the invention will be explained in more details in the following description with reference to preferred exemplary embodiments which are illustrated in the drawings, in which.

DETAILED DESCRIPTION OF PREFERRED EMBODIMENTS

With reference to the above-mentioned figures, a preferred embodiment of the present invention is provided.

Figure 1:
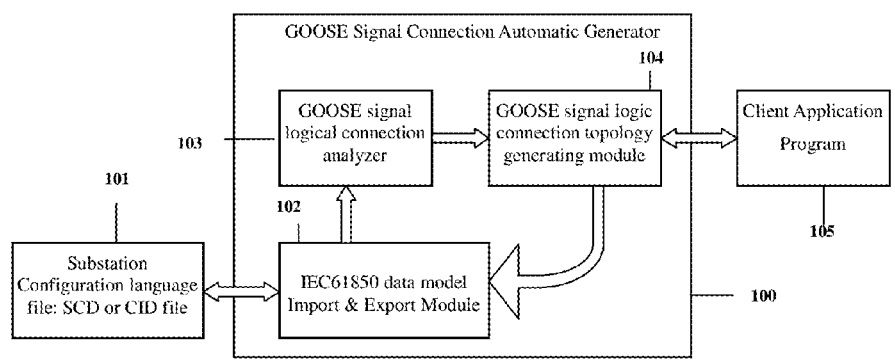
FIG. 1 schematically depicts the device for auto-generating GOOSE signal connection topology from substation level according to the preferred embodiments of the invention.

The device 100 for auto-generating GOOSE signal connection topology from substation level, as schematically depicted in FIG. 1, comprises IEC61850 data model importing module 102, GOOSE signal logical connection analyzer 103 and GOOSE signal logical connection topology data module 104.

The IEC61850 data model importing module 102 is to import SCD or CID file 101 and provide information for GOOSE signal logical connection analyzer 103. GOOSE signal logical connection analyzer 103 is to search all data models related to GOOSE configuration, identify input sources and output sources of all GOOSE signal and match said GOOSE output signals to GOOSE input signals. The GOOSE signal connection topology data module 104 is to generate GOOSE signal connection topology according to the connection relationship which is from the matching between GOOSE output signals and said GOOSE input signals. The IEC61850 data model importing module 102 can also be used to export substation configuration files. GOOSE signal connection topology data module 104 can also provide GOOSE signal connection topology for Client Application Program 105.

Figure 2:
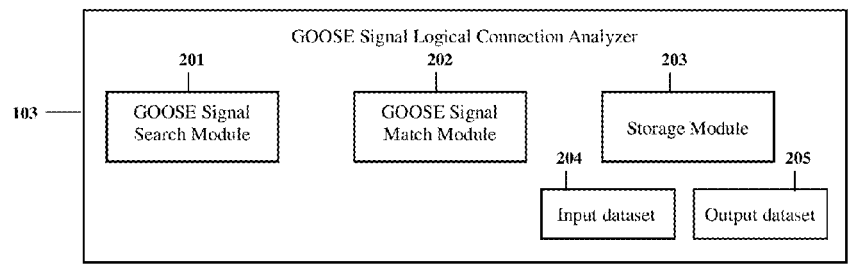
FIG. 2 schematically depicts the GOOSE signal logical connection analyzer according to the preferred embodiment of the invention.

As schematically depicted in FIG. 2, GOOSE signal logical connection analyzer 103 further comprises a GOOSE signal search module 201, a GOOSE signal match module 202 and a storage module 203. The GOOSE signal search module 201 is to search all communication sub-networks to check if there exists a communication sub-network that can transmit GOOSE signal; to search all access points in each said communication sub-network or search all intelligent electronic devices (IED) to find GOOSE control block; to find all output GOOSE signals in dataset which is referred by said GOOSE control block; and to find all input GOOSE signals in each logical node under each said logical device. GOOSE signal match module 202 is to search each input GOOSE signal stored within logical node of GOOSE logic link bus, and to search other logical nodes of GOOSE logic link bus to find the output signal corresponding to the input signal. The storage module 203 comprises an input dataset 204 for storing GOOSE input signals and an output dataset 205 for storing GOOSE output signals and their matching input signals.

Figure 3:
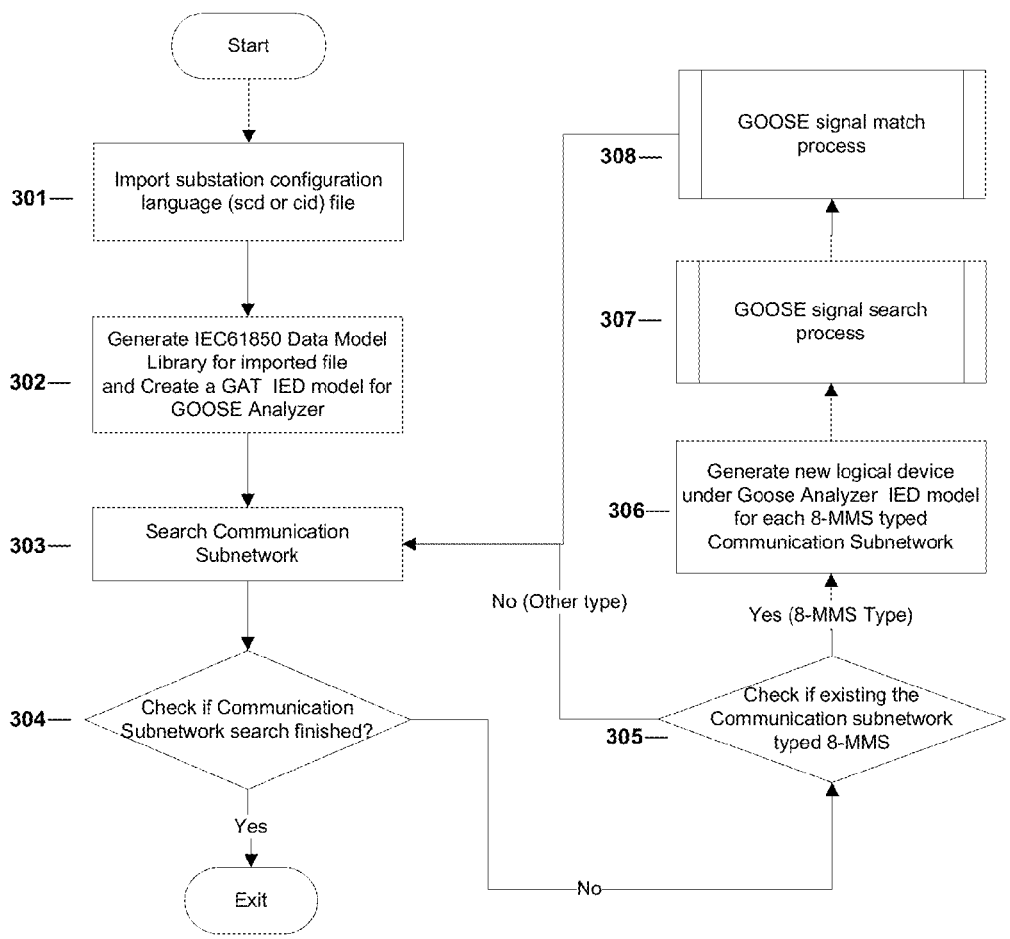
FIG. 3 is a master flowchart illustrating the process flow of the method of auto-generating GOOSE signal logical connection topology from substation level, according to the preferred embodiment of the invention.

FIG. 3 schematically depicts the method for auto-generating GOOSE signal connection topology from substation level. The method mainly comprises the following steps: import substation configuration language (SCL) file which is a SCD or CID file; search all GOOSE input and output signals under each access point; match the GOOSE output signals to GOOSE input signals; and generate GOOSE signal connection topology based on the result of matching.

Substation Configuration Description (.SCD) file 101 is the file describing the substation configuration in details. Configured IED Description (.CID) file is used for communication between an IED configuration tool and an IED. It can be considered as an SCD file stripped down to what the concerned IED needs to know and contains a mandatory communication section of the addressed IED. Those configuration files are generated as substation configuration files after substation engineering configuration. Configuration files based upon IEC61850 contains varieties of special data models, such as "Substation", "IED", and "Communication" and so on. There must be GOOSE configured information in configuration file, if any distributed application based on GOOSE is applied to process level or bay level or station level. For any IED sending GOOSE signals, SCD file 101 must contain GOOSE control block and GOOSE dataset, both of which must be within logical node zero (LLN0). And for any IED receiving GOOSE signals, SCD file 101 must contain GOOSE input information, which can be located under any functional logical node. GOOSE control block model is used to control GOOSE sending behaviours on network bus. GOOSE dataset contains an array of published signals from any logical node. GOOSE input model indicates where external signals for logical node comes from.

The configured SCD or CID files 101 will be explained in more details with reference to the following excerpt of GOOSE configuration information from SCD file.

```
<Communication>
  <SubNetwork name="WA1" desc="WA1" type="8-MMS">
    <ConnectedAP iedName="REF615_36" apName="LD0">
      <Address>
        <P type="SA">0</P>
        <P type="IP">10.10.10.36</P>
        <P type="IP-SUBNET">255.255.255.0</P>
        <P type="IP-GATEWAY">192.168.2.1</P>
        <P type="OSI-TSEL">0001</P>
        <P type="OSI-PSEL">00000001</P>
        <P type="OSI-SSEL">0001</P>
      </Address>
      <GSE ldInst="LD0" cbName="gcbGoose">
        <Address>
          <P type="MAC-Address">01-0C-CD-01-30-36</P>
          <P type="APPID">0036</P>
          <P type="VLAN-PRIORITY">4</P>
          <P type="VLAN-ID">001</P>
        </Address>
        <MinTime unit="s">4</MinTime>
        <MaxTime unit="s">1000</MaxTime>
      </GSE>
    </ConnectedAP>
  </SubNetwork>
</Communication>
<IED name="REF615_36" desc="REF615_36" type="REF615" manufacturer="ABB">
  <AccessPoint name="LD0">
    <Server>
      <Authentication none="true"/>
      <LDevice inst="LD0" desc="Protection">
        <LN0 inst="" desc="General" lnClass="LLN0" lnType=
          "REF615@IEC61850_@@@LLN0_ REX61X _C_1@
          1" >
          <DataSet name="Goose">
            <FCDA ldInst="LD0" prefix="TP" lnClass="GAPC"
              lnInst="4" doName="Op" daName=
              "general" fc="ST"/>
            <FCDA ldInst="LD0" prefix="TP" lnClass="GAPC"
              lnInst="4" doName="Str" daName= "general"
              fc="ST"/>
          </DataSet>
          <Inputs>
            <ExtRef iedName="REF615_37" ldInst="LD0"
              prefix="TP" lnClass="GAPC" lnInst="4"
              doName= "Op" daName="general"/>
```

```
            <ExtRef iedName="REF615_37" ldInst="LD0"
              prefix="TP" lnClass="GAPC" lnInst="4"
              doName="Str" daName="general"/>
          </Inputs>
          <GSEControl name="gcbGoose" datSet="Goose"
confRev="2" appID="G36">
            <IEDName>REF615_37</IEDName>
          </GSEControl>
```

All GOOSE configuration information is located in communication and IED section. In the excerpt, GOOSE sub-network information is as follows.

```
<GSE ldInst="LD0" cbName="gcbGoose">
  <Address>
    <P type="MAC-Address">01-0C-CD-01-30-36</P>
    <P type="APPID">0036</P>
    <P type="VLAN-PRIORITY">4</P>
    <P type="VLAN-ID">001</P>
  </Address>
  <MinTime unit="s">4</MinTime>
  <MaxTime unit="s">1000</MaxTime>
</GSE>
```

Under communication section, there are various communication sub-networks. If GOOSE signal is transmitted on the sub-network, it must be an 8-MMS type and contain GSE model information that records the parameters of the network behaviours. The IED connected to this sub-network can be found by GOOSE control block information which is shown as follows:

```
<GSEControl name="gcbGoose" datSet="Goose" confRev="2"
appID="G36">
  <IEDName>REF615_37</IEDName>
</GSEControl>
```

GOOSE control block information indicates that this IED contains GOOSE output signals which can be found in the logical node. GOOSE output signals in GOOSE Dataset are shown as follows:

```
<DataSet name="Goose">
  <FCDA ldInst="LD0" prefix="TP" lnClass="GAPC" lnInst="4"
    doName="Op" daName= "general" fc="ST"/>
  <FCDA ldInst="LD0" prefix="TP" lnClass="GAPC" lnInst="4"
    doName="Str" daName= "general" fc="ST"/>
</DataSet>
```

If other GOOSE signals can be input into the IED, input information, as shown as follows, will exist under the corresponding logical node, such as LLN0.

```
<Inputs>
  <ExtRef iedName="REF615_37" ldInst="LD0" prefix="TP"
    lnClass="GAPC" lnInst="4" doName= "Op" daName="general"/>
  <ExtRef iedName="REF615_37" ldInst="LD0" prefix="TP"
    lnClass="GAPC" lnInst="4" doName="Str" daName="general"/>
</Inputs>
```

With reference to the FIG. 3, a preferred embodiment of the method for auto-generating GOOSE signal connection topology from substation level is illustrated in details. After the substation configuration language file is imported 301, it is parsed by SCL schema based upon IEC61850 and all data modes in configuration file are created in memory at the step 302. And GOOSE signal logical connection analyzer 103 dynamically creates a GOOSE Analyzer Tool (GAT) IED which is appended into memory and associated with previous data models. The GAT IED includes access point model and server model. This GAT IED is the only instance in the substation.

In a substation automation system, there is one or more communication sub-networks and each sub-network may transmit GOOSE signals. According to IEC61850 standard, communication sub-network that can transmit GOOSE signal is a type of 8-MMS sub-network. Each communication sub-network is searched, at the step 303, by accessing IEC61850 data model in memory to check, at the step 305, if it is a type of 8-MMS sub-network. If it is true, GOOSE signal maybe be hosted by this sub-network, then go forward to the step 306. Otherwise, go back to the step 303 and continue to process the next communication sub-network. The step 303 will be executed until all communication sub-networks have been searched. Whether all communication sub-networks have been searched is checked at the step 304.

Figure 6:
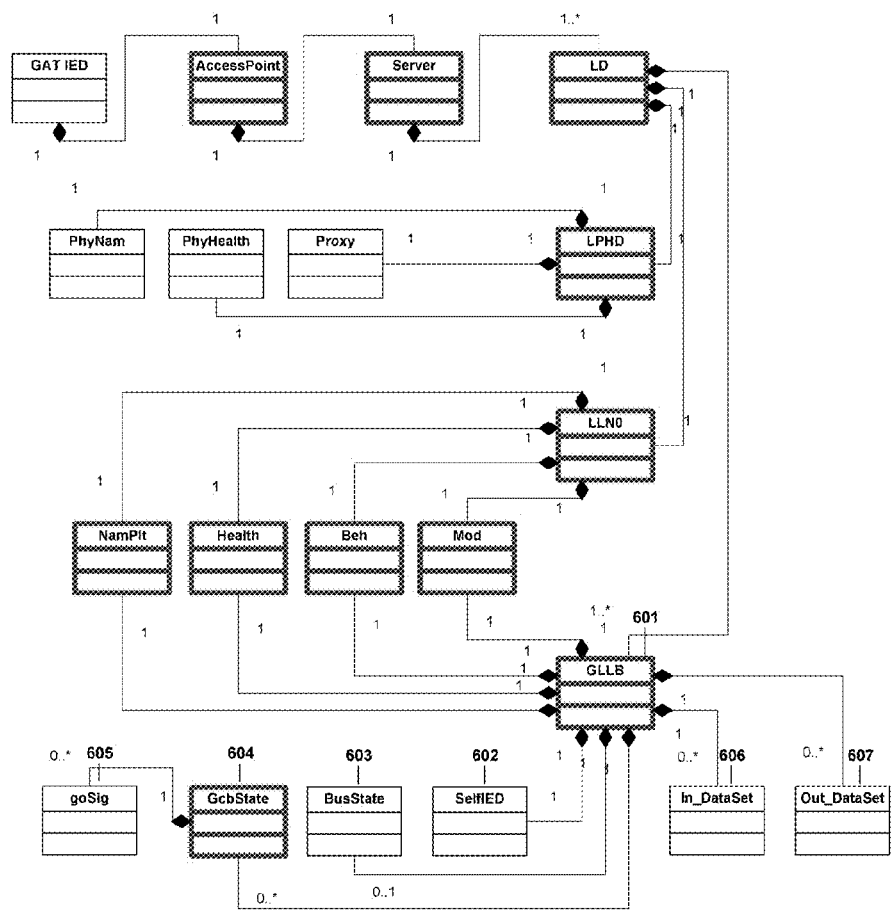
FIG. 6 schematically depicts data model base on IEC61850 of GOOSE signal logical connection topology according to the preferred embodiment of the invention.

At the step 306, GOOSE signal logical connection analyzer 103 dynamically creates a logic device for each 8-MMS communication sub-network according to the principle of GAT IED model as shown in FIG. 6. Each logic device stands for the model of the sub-network and is added to Server in GAT IED.

Figure 4:
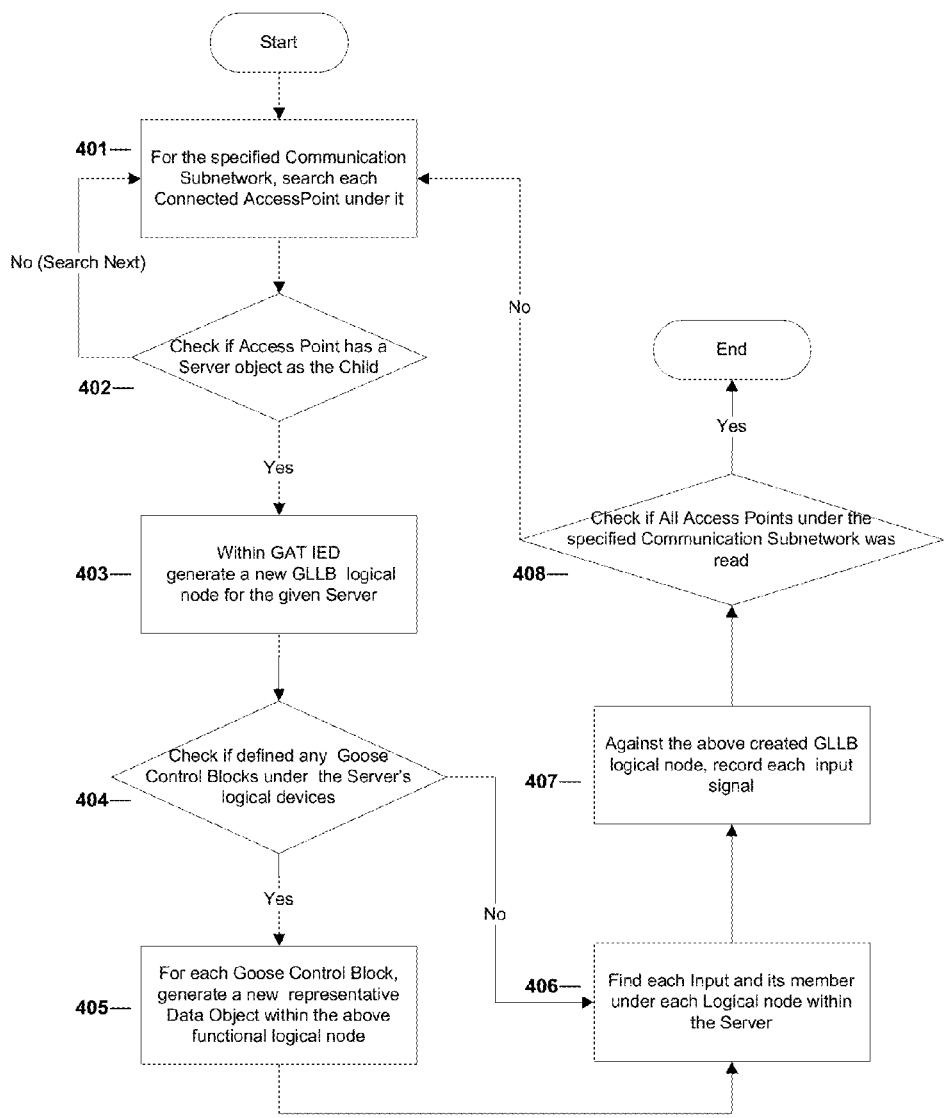
FIG. 4 is a sub-flowchart illustrating search for all of GOOSE input and output signal under each access point on each 8-MMS sub-network hierarchically, according to the preferred embodiment of the invention.

When the step 306 is finished, the method goes into GOOSE signal search process 307 which is illustrated in details as shown in FIG. 4.

This process is to search all GOOSE input and output signals under each access point on each 8-MMS sub-network hierarchically. At the first step 401, GOOSE signal search module 201 searches all access points in the communication sub-network according to the information from previous step 306. Then, at the step 402, whether each access point has a server object is checked. In general, if an IED is a client, server object will not exist and this IED can not send or receive GOOSE signals. Then GOOSE signal search module 201 continues to process next access point. If an IED is a server on the network for providing data service, server object must exist. Then, at the step 403, GOOSE signal logical connection analyzer 103 dynamically create a GOOSE logic link bus (GLLB) object for this analyzed IED and add it into GAT IED object. GLLB object is a modelled GOOSE logic link bus and is used to establish relationship between GOOSE input signals and output signals. Then, the method goes to the step 404. Whether a GOOSE control block object exists under the server is checked. If it does not exist, go to the step 406. Otherwise, the IED must have GOOSE signal output. At the step 405, data object of GcbState 604, as shown in FIG. 6, is created dynamically for each GOOSE control block. Each real GOOSE signal, which is referred by this control block from GOOSE dataset, is found out and the corresponding GoSig 605 data attribute is created for each real GOOSE signal under the GcbState data object, as shown in FIG. 6. Then, at the step 406, all GOOSE input signals from each logical node under logical devices are searched. If any input object is found, go to the step 407, the input information is recorded temporally in internal memory. In the last step 408, whether all access points have been searched is checked. If so, go to the matching process 308.

Figure 5:
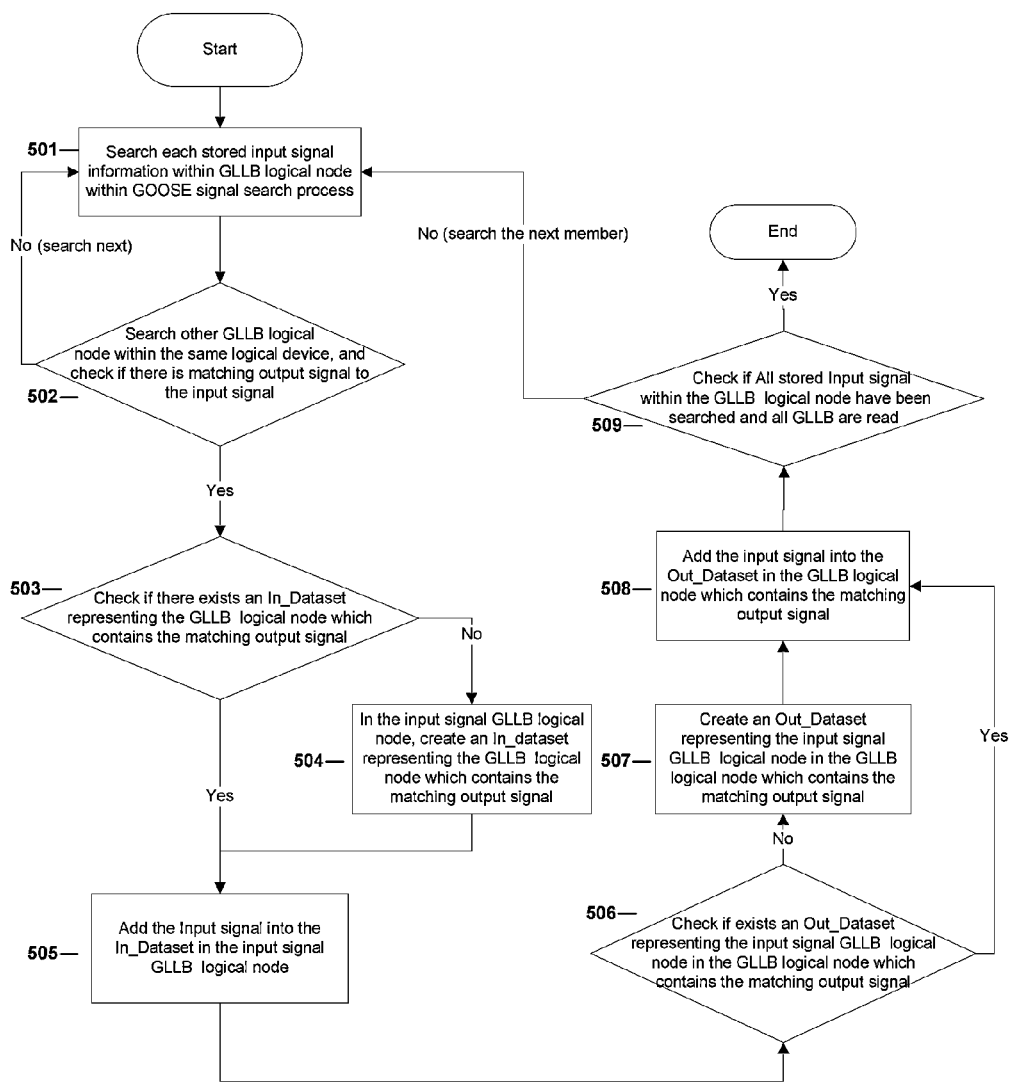
FIG. 5 is a sub-flowchart illustrating the matching between output signals to input signals, and creating In_DataSet and Out_DataSet dynamically, according to the preferred embodiments of the invention.

In the step 308, matching between input signals and output signals is made, and In_DataSet and Out_DataSet are created dynamically. The flowchart in FIG. 5 illustrates the process of matching between the output signals and the input signals in details. At the step 501, all stored input signals within GLLB logical node found in the previous GOOSE signal search process 307 are searched. To each input signal, at the step 502, all other GLLB logical nodes within the same logical device are searched to find the GLLB logical nodes which contain the matching output signal. If the matching output signal to above input signal is not found, it indicates that the input signal is error during configuration phase. Otherwise, an association is established between the GLLB logical node which contains the input signal and the GLLB logical node which contains the matching output signal. In the following steps, an In_DataSet object of will be created in the GLLB logical node for recording the input signal and an Out_DataSet will be created in the GLLB logical node for recording the matching output signal and the input signal. After all output signals matching to input signals have been finished, see FIG. 6, a set of In_DataSet objects will be created in each GLLB logical node, and each In_DataSet object represents a GLLB logical node which contains the output signals and the matching the input signals from the In_DataSet GLLB logical node. In the same way, a set of Out_DataSet objects will be created in each GLLB logical node, and each Out_DataSet object represents a GLLB logical node which contains the matching output signals.

At the step 503, whether an In_DataSet represents the GLLB logical node which contains the matching output signal is checked. If it exists, go to the step 505. Otherwise, at the step 504, a new In_DataSet object is created dynamically. Then, at the step 505, the input signal is added into the In_DataSet. And at the step 506, whether an Out_DataSet, in the matching output signal GLLB logical node, represents the GLLB logical node which contains matched input signal is checked. If it exists, go to the step 508. Otherwise, at the step 507, a new Out_DataSet object is created dynamically. Then, at the step 508, the input signal is added into the Out_DataSet.

At the step 509, whether all stored input signals within the GLLB logical nodes and all GLLB have been searched is checked. The matching process 308 will executed until the step 508 returns "YES".

Finally, GOOSE signal connection topology is generated according to above matching results. As shown in FIG. 6, GOOSE signal logical connection analyzer 103 is modelled as an IED with monitoring and analyzing function for GOOSE base on IEC61850 standard. The IED is called GAT IED. As a standard IED model, GAT IED always contains access points and servers and one or more logical device (LD) models. Under GAT IED model, each LD is specially modelled for each GOOSE communication sub-network. And GOOSE signals on said communication sub-network are monitored and analyzed. The number of LD instance is generated dynamically by GOOSE signal logical connection analyzer 103. According to IEC6180, both logical node instances of physical logical node (LPHD) and LLN0 must exist as mandatory model in each LD, and the data objects in the two logical nodes have mandatory data attributes. All of IEC61850 standardized models will not be explained in details any more. Besides above mentioned logical nodes, there is a very important logical node called GLLB 601 under the LD model. GLLB 601 is defined privately complying with IEC61850 expanded rule and represents expanded logical node. A GOOSE signal connection bus, which represents an analyzed IED that publishes or subscribes GOOSE on communication sub-network, is modelled as logical node of GLLB 601. The logical node instance number of GLLB 601 is determined by the number of IED with GOOSE signal on the same communication sub-network and created dynamically by GOOSE signal logical connection analyzer. For example, there are five IEDs sending and receiving GOOSE signals to/from each other in a communication sub-network, then five logical node instances of GLLB will be created dynamically under a LD in GAT IED. Each GLLB 601 contains all related IED information which indicates the sending and receiving of GOOSE signals. The data object of SelfIED 602 is modelled for sending IED on GOOGSE logic link bus. The data object of BusState 603 is modelled for network state of GOOSE signal connection bus. It is used to monitor network operation state of IED sending GOOSE signal to network. The data object of GcbSig 603 is modelled for monitoring the states of each GOOSE control block in each sending IED. The data attribute of GoSig 605 under GcbSig 603 is modelled for GOOSE real signal in GOOSE dataset. Each GoSig 605 is used for addressing each real GOOSE signal source and reading values. And Each GoSig 605 can be operated on real GOOSE signal sources.

In_DataSet 606 means a data set of GOOSE input signal in the GOOSE logic link bus and Out_DataSet 607 means a data set of GOOSE output signal in the GLLB. By associating input data set and output data set into the same logic bus, GOOSE signal connection topology is generated.

GOOSE signal connection topology can be used not only for testing and tracing GOOSE signals, but also for monitoring and reliably analyzing GOOSE signal online in real time. Consequently, the dependability of GOOSE application is raised.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for auto-generating a GOOSE signal connection topology from a substation level, comprising:
   importing a substation configuration language file;
   searching all input GOOSE signals and all output GOOSE signals under each access point, wherein the searching comprises:
      searching all access points in each communication sub-network;
      checking if each access point has a server;
      checking if a GOOSE control block exists in each a device under said server;
      finding all output GOOSE signals in a dataset referred to by said GOOSE control block; and
      finding all input GOOSE signals in each logical node under each said logical device;
   matching said output GOOSE signals to said input GOOSE signals; and
   generating the GOOSE signal connection topology based on a result of said matching.

2. The method according to claim 1, further comprising:
   generating a data model library for the substation configuration language file.

3. The method according to claim 2, further comprising:
   searching all communication sub-networks to check if the communication sub-network exists that transmits the GOOSE signal.

4. The method according to claim 1, wherein the searching of all input GOOSE signals and output GOOSE signals further comprises:
   searching all intelligent electronic devices;
   checking if said access point has the server;
   checking if the GOOSE control block exists in each logical device under said server; and
   finding all output GOOSE signals in the dataset referred to by said GOOSE control block; and
   finding all input GOOSE signals in each logical node under each said logical device.

5. The method according to claim 4, further comprising:
   creating an intelligent electronic device for GOOSE analysis; and
   generating a new logical node of GOOSE logic link bus for the said server in said IED.

6. The method according to claim 5, said matching said output GOOSE signals to said input GOOSE signals, comprises:
   1) searching each said input GOOSE signal within logical node of GOOSE logic link bus; and
   2) searching other logical nodes of GOOSE logic link bus to find the output signal corresponding to said input signal.

7. The method according to claim 6, further comprising:
   creating an input dataset for input GOOSE signals and an output dataset for output GOOSE signals in said logical node of GOOSE logic link bus.

8. The method according to claim 7, further comprising:
   adding the input GOOSE signals into the input dataset; and
   adding the input GOOSE signals into the output dataset of a matching output signal of the input GOOSE signals.

9. The method according to claim 1, further comprising:
   creating an intelligent electronic device for GOOSE analysis; and
   generating a new logical node of GOOSE logic link bus for the said server in said IED.

10. The method according to claim 1, said matching said GOOSE output signals to said GOOSE input signals, comprising:
    1) searching each said input GOOSE signal within logical node of GOOSE logic link bus; and
    2) searching other logical nodes of GOOSE logic link bus to find the output signal corresponding to said input signal.

11. The method according to claim 7, further comprising:
    creating an input dataset for input GOOSE signals and an output dataset for output GOOSE signals in said logical node of GOOSE logic link bus.

12. The method according to claim 8, further comprising:
    adding the input GOOSE signals into the said input dataset; and
    adding the input GOOSE signals into the output dataset of its matching output signal.

13. A device for auto-generating a GOOSE signal connection topology from a substation level, comprising:
    an importing module for importing a substation configuration language file;
    a GOOSE signal analyzer for searching all input GOOSE signals and all output GOOSE signals under each access point, wherein the GOOSE signal analyzer matches said output GOOSE signals to said input GOOSE signals, wherein the searching comprises:
       searching all access points in each communication sub-network;

checking if each access point has a server;
checking if a GOOSE control block exists in each logical device under said server;
finding all output GOOSE signals in a dataset referred to by said GOOSE control block; and
finding all input GOOSE signals in each logical node under each said logical device; and
a topology data module for generating the GOOSE signal connection topology based on said matching.

14. The device according to claim 10, wherein said GOOSE signal analyzer, comprises:
a storage module, wherein the storage module comprises an input dataset for storing input GOOSE signals and an output dataset for storing output GOOSE signals and matching input GOOSE signals that match output GOOSE signals.

15. A method for auto-generating a GOOSE signal connection topology from a substation level, comprising:
importing a substation configuration language file;
searching all GOOSE input and output signals under each access point, wherein the searching comprises:
searching all intelligent electronic devices;
checking if said access point has a server;
checking if a GOOSE control block exists in each logical device under said server;
finding all output GOOSE signals in a dataset referred to by said GOOSE control block; and
finding all input GOOSE signals in each logical node under each said logical device;
matching said GOOSE output signals to said GOOSE input signals; and
generating the GOOSE signal connection topology based on a result of said matching.

16. The method according to claim 15, further comprising:
generating a data model library for the substation configuration language file.

17. The method according to claim 16, further comprising:
searching all communication sub-networks to check if the communication sub-network exists that transmits the GOOSE signal.

18. The method according to claim 15, further comprising:
creating an intelligent electronic device for GOOSE analysis; and
generating a new logical node of GOOSE logic link bus for the said server in said IED.

19. The method according to claim 15, said matching said output GOOSE signals to said input GOOSE signals, comprises:
1) searching each said input GOOSE signal within logical node of GOOSE logic link bus; and
2) searching other logical nodes of GOOSE logic link bus to find the output signal corresponding to said input signal.

* * * * *